US010581595B2

(12) United States Patent
Fiege et al.

(10) Patent No.: US 10,581,595 B2
(45) Date of Patent: *Mar. 3, 2020

(54) GENERATING PUBLIC/PRIVATE KEY PAIRS TO DEPLOY PUBLIC KEYS AT COMPUTING DEVICES TO VERIFY DIGITAL SIGNATURES

(71) Applicant: INTERNATIONAL BUSINESS MACHINES CORPORATION, Armonk, NY (US)

(72) Inventors: Thomas Fiege, Salinas, CA (US); Michael P. Groover, Vail, AZ (US); Mark E. Hack, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/446,700

(22) Filed: Mar. 1, 2017

(65) Prior Publication Data

US 2018/0254890 A1    Sep. 6, 2018

(51) Int. Cl.
*H04L 9/08* (2006.01)
*H04L 9/32* (2006.01)
(Continued)

(52) U.S. Cl.
CPC .............. *H04L 9/08* (2013.01); *H04L 9/0891* (2013.01); *H04L 9/14* (2013.01); *H04L 9/3247* (2013.01); *H04L 9/3271* (2013.01); *H04L 63/10* (2013.01)

(58) Field of Classification Search
CPC . H04L 63/0428; H04L 63/1458; H04L 9/002; G06F 1/12
(Continued)

(56) References Cited

U.S. PATENT DOCUMENTS 6,052,466 A    4/2000 Wright
6,532,543 B1   3/2003 Smith et al.
(Continued)

OTHER PUBLICATIONS

J. Li, "Revere—Disseminating Security Updates at Internet Scale", University of California Los Angeles, 2002, pp. 219.
(Continued)

*Primary Examiner* — Evans Desrosiers
(74) *Attorney, Agent, or Firm* — David W. Victor; Konrad Raynes Davda & Victor LLP (57) ABSTRACT

Provided are a computer program product, system, and method for generating public/private key pairs to deploy public keys at computing devices to verify digital signatures. A plurality of public-private key pairs are generated to store in a key store. A set of public keys of the public-private key pairs is distributed to the computing systems to use to verify purported digitally signed challenges. One of the public-private key pairs is selected to use a private key of the selected one of the public-private key pairs as a current private key to use to digitally sign challenges from the computing systems. A determination is made to retire the current private key. Another one of the public-private key pairs is selected and the current private key is set to a private key of the selected another one of the public-private key pairs to use to digitally sign challenges from the computing systems.

18 Claims, 7 Drawing Sheets

(51) Int. Cl.
*H04L 29/06* (2006.01)
*H04L 9/14* (2006.01)

(58) Field of Classification Search
USPC .......................................................... 713/176
See application file for complete search history.

(56) References Cited

U.S. PATENT DOCUMENTS

| | | | |
|---|---|---|---|
| 6,918,038 | B1 | 7/2005 | Smith et al. |
| 6,959,382 | B1 | 10/2005 | Kinnis et al. |
| 8,989,383 | B2 | 3/2015 | Ashdown |
| 9,288,208 | B1 | 3/2016 | Roth et al. |
| 2004/0103283 | A1* | 5/2004 | Hornak .................. H04L 29/06 713/175 |
| 2005/0262552 | A1 | 11/2005 | Brown et al. |
| 2006/0159269 | A1* | 7/2006 | Braun .................. H04L 9/0833 380/277 |
| 2006/0182283 | A1 | 8/2006 | Sandhu et al. |
| 2009/0208015 | A1 | 8/2009 | Kamat et al. |
| 2016/0043870 | A1 | 2/2016 | Avanzi |
| 2016/0269370 | A1 | 9/2016 | White et al. |
| 2017/0103382 | A1 | 4/2017 | Kim et al. |
| 2018/0254889 | A1 | 9/2018 | Fiege et al. |

OTHER PUBLICATIONS

Z. Le, et al., "Preventing Unofficial Information Propagation", International Conference on Information and Communications Security, Springer Berlin Heidelberg, 2007, pp. 13.

A. Srinivasan, et al., "Auditing Cloud Storage by Key Coverage Conflict in Cloud", . International Journal of Scientific & Engineering Research, vol. 6, Issue 10, Oct. 2015, pp. 8.

A. Narayanan, et al., "Bitcoin and Cryptocurrency Technologies", Princeton University Pres, 2016, pp. 29.

"Digital signature", Wikipedia, [online][retrieved Feb. 14, 2017] https://en.wikipedia.org/wiki/Digital_signature, pp. 6.

"Challenge-response authentication", Wikipedia, [online][retrieved Feb. 14, 2017] https://en.wikipedia.org/wiki/Challenge-response_authentication, pp. 3.

U.S. Appl. No. 15/446,677, filed Mar. 1, 2017, (18.704).

List of IBM Patents or Patent Applications Treated as Related, dated Mar. 1, 2017, pp. 2.

Office Action dated Dec. 12, 2018, pp. 18 for U.S. Appl. No. 15/446,677, (18.704).

Notice of Allowance dated Apr. 3, 2019, pp. 9, for U.S. Appl. No. 15/446,677, (18.704).

Response dated Mar. 12, 2019, pp. 10, to Office Action dated Dec. 12, 2018, pp. 18 for U.S. Appl. No. 15/446,677, (18.704).

U.S. Appl. No. 16/556,214, filed Aug. 29, 2019.

Preliminary Amendment filed Aug. 29, 2019, pp. 7, for U.S. Appl. No. 16/556,214, filed Aug. 29, 2019.

U.S. Appl. No. 16/434,074, filed Jun. 6, 2019.

Preliminary Amendment filed Jun. 6, 2019, pp. 8, for U.S. Appl. No. 16/434,074, filed Jun. 6, 2019.

List of IBM Patents or Patent Applications Treated as Related, pp. 2, Sep. 13, 2019.

* cited by examiner

FIG. 1

Ordered Public/Private Key Pair

FIG. 2

Ordered Public Key

FIG. 3

Challenge

GENERATING PUBLIC/PRIVATE KEY PAIRS TO DEPLOY PUBLIC KEYS AT COMPUTING DEVICES TO VERIFY DIGITAL SIGNATURES

BACKGROUND OF THE INVENTION

1. Field of the Invention

The present invention relates to a computer program product, system, and method for generating public/private key pairs to deploy public keys at computing devices to verify digital signatures.

2. Description of the Related Art

Certain computer systems utilize a challenge-response mechanism to authenticate a user trying to access the system. An authentication system, operated by a provider entity providing authentication services for the customer systems, such as operated by a vendor or manufacturer of the customer systems, will generate a public-private key and distribute the public key to the customer systems needing to use for authentication. When a user attempts to access any of the customer systems, such as a server or storage controller, which may be deployed widely in the field, the customer system will provide an unencrypted challenge to the user. The user will then provide the challenge to the authentication system and if the user is allowed to access the customer system, the authentication system will sign the challenge with the private key to provide a signature. The customer system can then authenticate the user with a signature verifying algorithm that accepts or rejects the message using the public key and the challenge to verify that the user was approved by the authentication system.

Over time, the authentication system may have to invalidate the private key as part of routine key retention policies or if the private key has become compromised. In such case, the authentication system will need to generate a new public-private key pair and distribute the new public key to all the customers systems to use to verify digitally signed challenges from the authentication system to authenticate users seeking to access the customer systems.

There is a need in the art for improved techniques for managing public-private keys for purposes of authentication.

SUMMARY

Provided are a computer program product, system, and method for generating public/private key pairs to deploy public keys at computing devices to verify digital signatures. A plurality of public-private key pairs are generated to store in a key store. A set of public keys of the public-private key pairs is generated. The set of public keys is distributed to the computing systems to use to verify purported digitally signed challenges presented to the computing systems that are signed by the authentication system. One of the public-private key pairs is selected to use a private key of the selected one of the public-private key pairs as a current private key to use to digitally sign challenges from the computing systems. A determination is made to retire the current private key. Another one of the public-private key pairs available in the key store is selected and the current private key is set to a private key of the selected another one of the public-private key pairs to use to digitally sign challenges from the computing systems.

DETAILED DESCRIPTION

In certain security intensive infrastructures, network communication is limited and the customer system may not be connected to a network the authentication service provider may access. To distribute a new public key for such customer systems not connected to the authentication system over a network, the authentication provider will have to distribute the new public key manually so administrators of security isolated customer systems can manually upload the public key.

Described embodiments provide techniques to allow the authentication service provider to retire a public-private key pair and begin using a new private key without having to distribute the new public key for the private key to customer systems, especially those customer systems not connected to the authentication system over a network. With described embodiments, the authentication system may generate a plurality of public-private key pairs and distribute a plurality of public keys to customer systems. The customer systems may store the plurality of public keys in a local key store. The customer systems in response to a request to access computational resources in the system, will return a challenge for the requestor to present to the authentication server to digitally sign using one of the private keys of the generated public-private key pairs. The customer system upon receiving a purported digitally signed challenge, may use one or more of the public keys to verify the purported digitally signed challenge and grant access if the signed challenge is verified or accepted, using a signature verifying algorithm. In this way, the authentication service provider may change the private key being used without having to distribute a new public key to customer systems isolated from network communication to use to verify returned digitally signed challenges.

Figure 1:
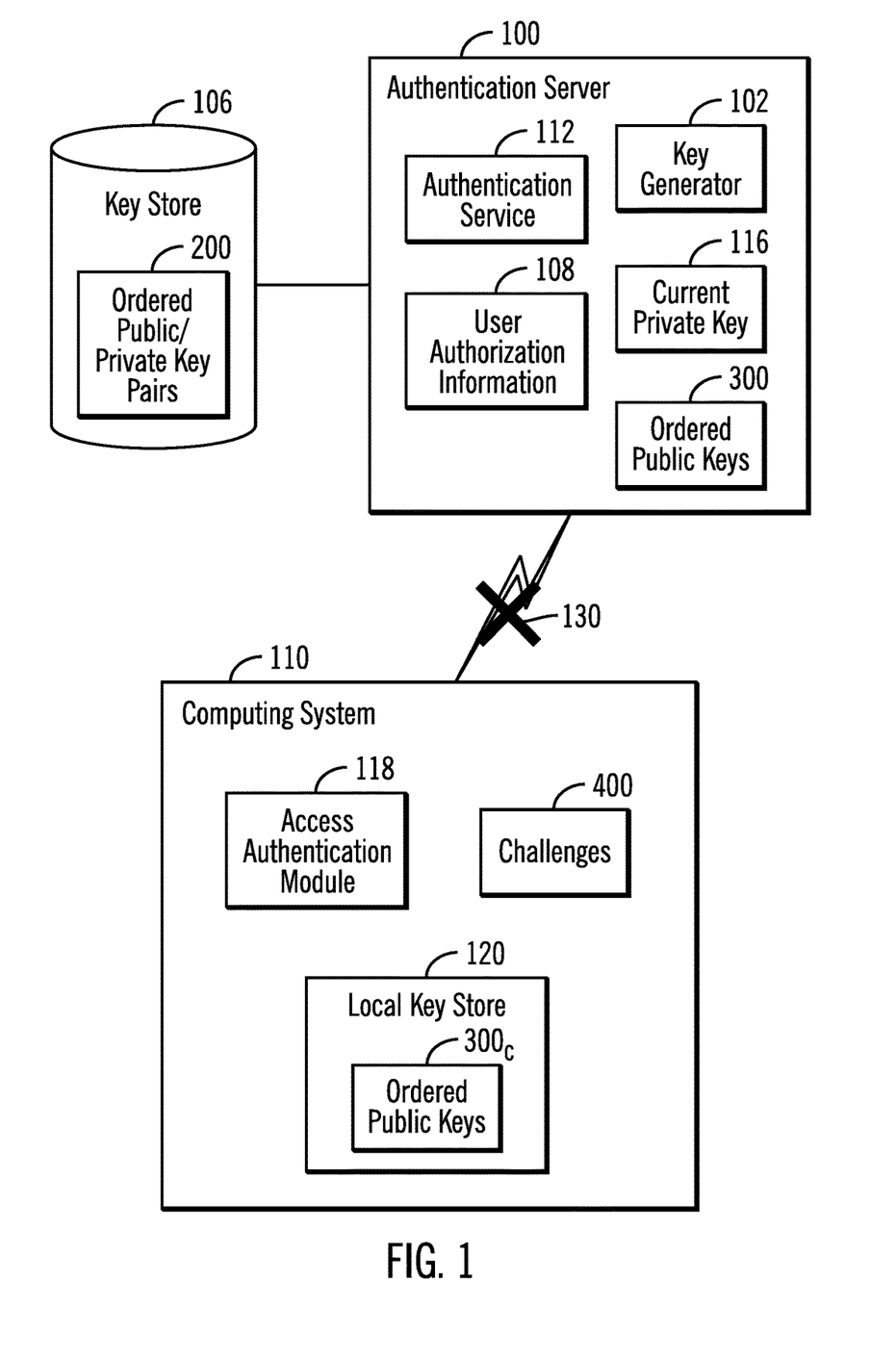
FIG. 1 illustrates an embodiment of a computing environment.

FIG. 1 illustrates an embodiment of a computing environment comprising an authentication server 100 that has a key generator 102 to generate a plurality of ordered public/private key pairs 200 that are maintained in an ordering with respect to each other and stored in a key store 106. The public/private key pairs 200 are generated according to a public key cryptography algorithm in the key generator 102. The authentication server 100 includes user authorization information 108 having information on users registered to access computing systems 110. The authentication server 100 includes a authentication service 112 to extract ordered public keys 300 from the ordered public/private keys 200 in the key store 106 to distribute to the computing systems 110. The authentication server 100 includes a digital signature algorithm to use a key designated as a current private key 116 from one of the ordered public/private key pairs 200 to digitally sign a challenge from the computing system 110, so that the computing system 110 may use one of the received ordered public keys 300 to verify whether to accept or reject a challenge to confirm the challenge was signed with the current private key 116.

In certain embodiments, the key store 106 may not be connected to the authentication server 100 to maintain the security of the ordered public/private key pairs 200, which requires an administrator of the authentication sever 100 to manually retrieve a private key from the ordered public/private key pairs 200 in the key store 106 to use as the current private key 116.

The computing system 110 includes an access authentication module 118 to use to determine whether a person seeking to access the computing system 110, referred to as a "requestor", to perform maintenance, repairs or updating is authorized by the authentication server 100. The computing system 110 maintains a local key store 120 including ordered public keys $300_C$ comprising a copy of the ordered public keys 300 provided by the authentication server 100. When the requestor seeks to access the computing system 110, the access authentication module 118 generates a challenge 400 to the requestor to obtain a digitally signed challenge from the authentication server 100. The access authentication module 118 may include a signature verifying algorithm to authenticate the requestor user by using the ordered public keys $300_C$ to verify a purported digitally signed challenge. The generated challenge 400 may comprise a cryptographic nonce generated by a cryptographically secure pseudorandom number generator and cryptographic hash function can generate challenges that are highly unlikely to occur more than once.

In the embodiment of FIG. 1, the computing system 110 and the authentication server 100 are not connected via network or cable connection and are electronically isolated from one another, as shown with the representation 130 showing no electronic communication therebetween. The computing system 110 may comprise a server or computing device sold by the operator of the authentication server 100 or another entity providing authentication services. However, the operator of the computing system 110 may want to verify that a technician or requestor seeking to access the computing system 110 is verified and authorized by the vendor that distributed the computing system 110 even though the computing system 110 and authentication system 100 are not connected via a network to allow authentication to be handled over a network.

Figure 2:
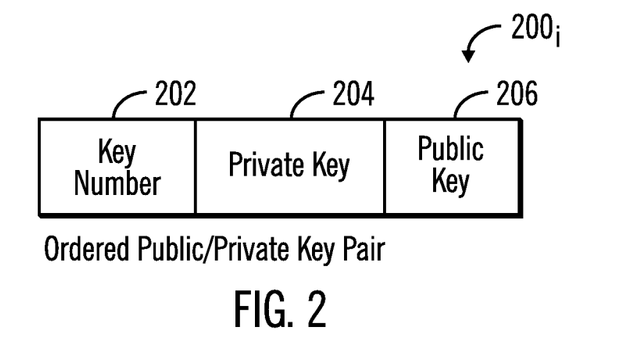
FIG. 2 illustrates an embodiment of an ordered public/private key pair.

FIG. 2 illustrates an instance $200_i$ of the public/private key pair stored in the key store 106 as including a key number 202 providing an ordering of the public/private key with respect to others in the key store 106, the generated private key 204 and the corresponding public key 206 capable of verifying strings digitally signed by the private key 204 using a cryptographic signing algorithm In one embodiment, the ordering may be indicated in the key number 202. In an alternative embodiment, the ordering of the public/private key pairs 200 may be indicated implicitly by their arrangement in a list or other data structure.

Digital signature and signature verifying algorithms included in the authentication service 112 and access authentication module 118, respectively, known in the art may be used, such as, but not limited to, the Digital Signature Algorithm (DSA), developed by the National Institute of Standards and Technology.

Figure 3:
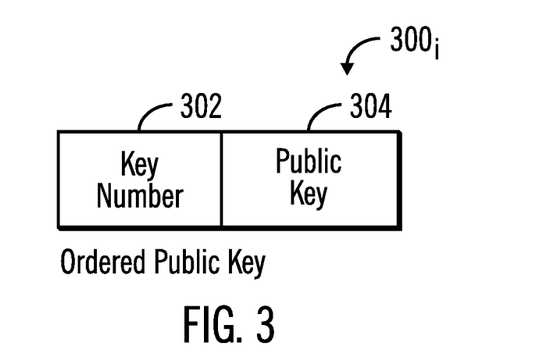
FIG. 3 illustrates an embodiment of an ordered public key.

FIG. 3 illustrates an instance $300_i$ of one of the ordered public keys, including a key number 302 indicating the ordering of a public key 304 with respect to other public keys in the ordered public keys 300. In one embodiment, the ordering may be indicated in the key number 302. In an alternative embodiment, the ordering of the public keys may 300 be indicated implicitly by their arrangement in a list or other data structure.

Figure 4:
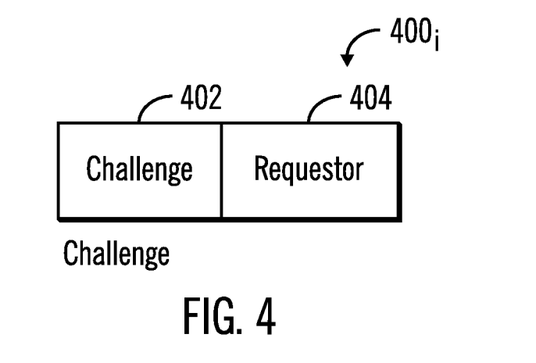
FIG. 4 illustrates an embodiment of a challenge.

FIG. 4 illustrates an instance $400_i$ of one of the generated challenge generating for a requestor attempting to access the computing system 110, and includes the generated challenge 402, such as a cryptographic nonce, and an identifier of a requestor 404 for which the challenge 402 was generated.

Figure 5:
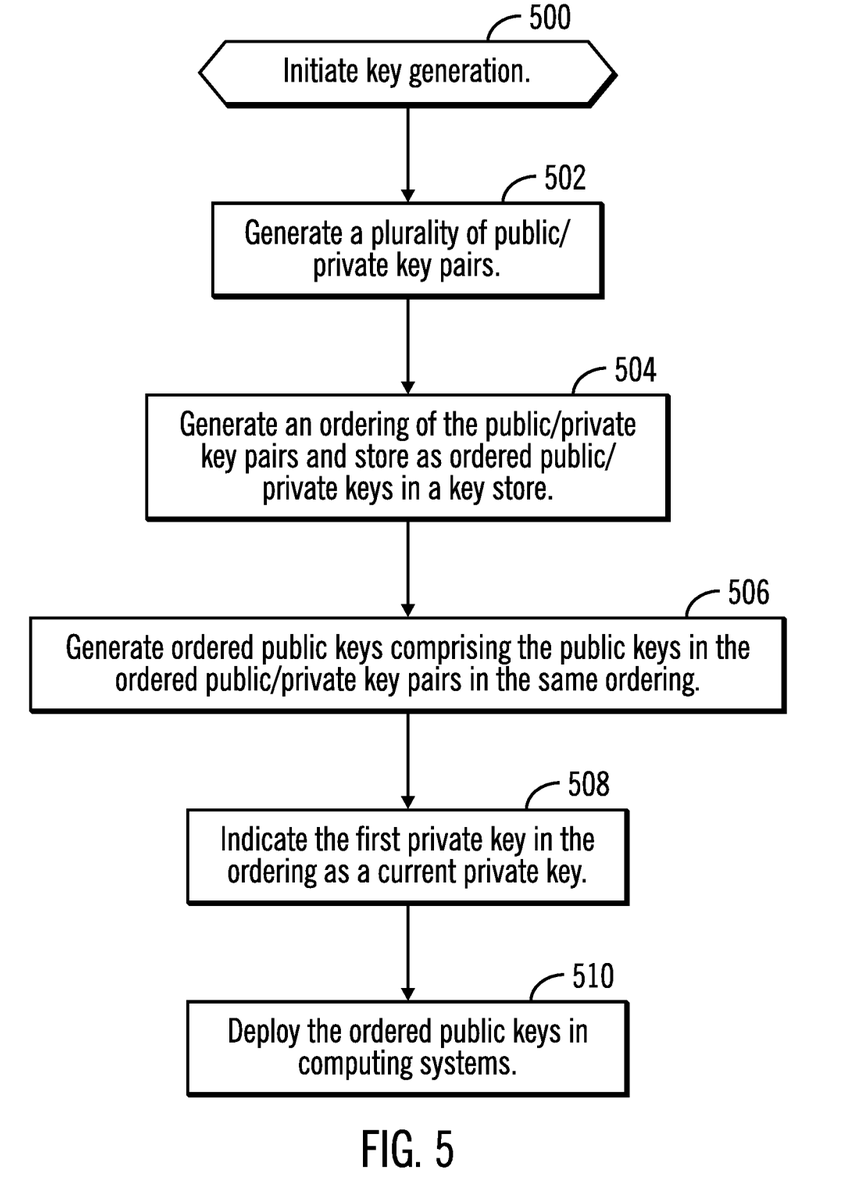
FIG. 5 illustrates an embodiment of an operation to generate public/private keys.

FIG. 5 illustrates an embodiment of operations performed by the key generator 102 and authentication service 112 to generate the public/private keys to use to authenticate access to deployed computing systems 110. Upon the initiating key generation, the key generator 102 generates (at block 502) a plurality of public/private key pairs 200 according to a public key cryptographic algorithm, the intention being that if the current used private key becomes compromised, the authentication server 100 may select another private key of the available public/private key pairs 200 in the key store 106 to use without have to coordinate the change with the computing systems 110, which may be remote and not in communication with the authentication server 100. The authentication service 112 generates (at block 504) an ordering of the public/private key pairs and stores the ordered public/private key pairs 200 in the key store 106. The ordering may be explicit, such as in a key number 202, or implicit, such as the order of arrangement in a list or data structure. The authentication service 112 further generates (at block 506) ordered public keys 300 comprising the public keys 304 in the public/private key pairs 200, in the same ordering as presented in the public/private key pairs 200. The ordering may be explicit such as in a key number 302 or implicit such as the order of arrangement in a list or data structure.

The first private key 204 in the ordering is indicated (at block 508) as a current private key 116 the authentication service 112 uses to digitally sign challenges from the computing systems 110 using a cryptographic signing algorithm. The ordered public keys 300 are then deployed (at block 510) to the computing systems 110. The ordered public keys 300 may be deployed by a user at the computing systems 110 downloading the ordered public keys 300 from a web site or distributed through a removable non-volatile memory device, such as a Flash drive, Security Disk (SD) card, Compact Disc (CD), etc. In such deployment arrangements, the authentication server 100 is not connected to the computing system 110 over a network. In an alternative embodiment, the computing system 110 may be temporarily connected to the authentication server 100 for the purpose of receiving the ordered public keys 300.

Figure 6:
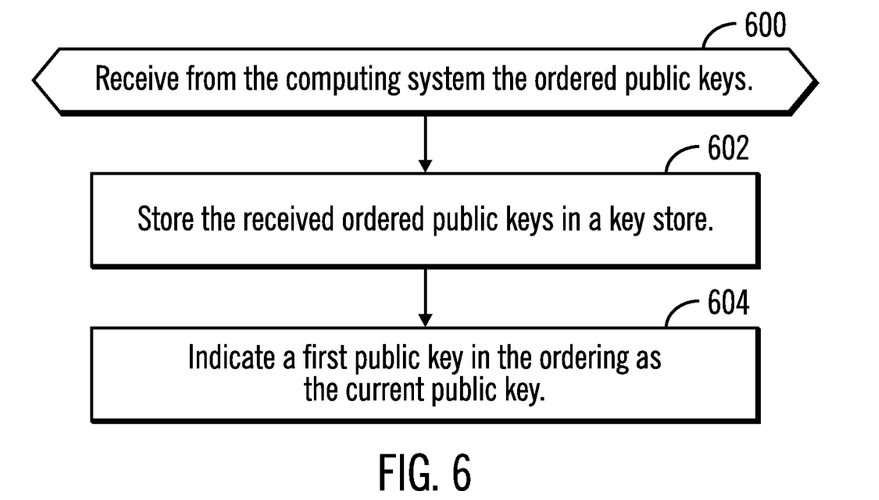
FIG. 6 illustrates an embodiment of operations to receive ordered public keys.

FIG. 6 illustrates an embodiment of operations performed by the access authentication module 118 at the computing system 110 to maintain a received copy of the ordered public keys $300_C$. Upon receiving (at block 600) a copy of the ordered public keys $300_C$, the received ordered public keys are stored (at block 602) in a local key store 120 used by the computing system 110. The first public key 304 in the ordering is then selected (at block 604) to use as a current public key to first try to use to verify digitally signed messages from requestors.

Figure 7:
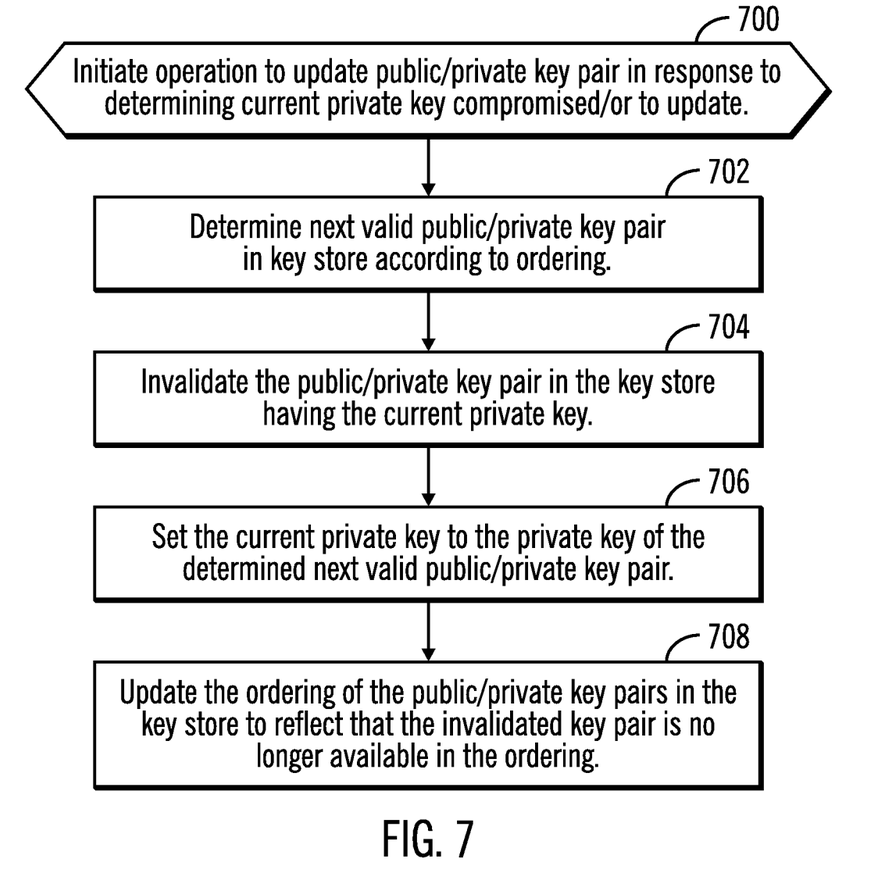
FIG. 7 illustrates an embodiment of operations to update a public/private key pair used by the authentication server.

FIG. 7 illustrates an embodiment of operations performed by the authentication service 112 to use a new private key of the ordered public/private key pairs 200, which may be done if the current private key 116 has become compromised or as part of a routine retirement of the current private key 116. Upon initiating an operation (at block 700) to update the current private key 116, the authentication service 112or an administrator of the authentication server 100 determines (at block 702) a next valid public/private key pair $200_i$ in the key store according to the ordering. The public/private key pair $200_i$ in the key store having the current private key 116 is invalidated (at block 704) and the current private key 116 is set (at block 706) to the private key 204 of the determined next valid public/private key pair $200_i$. When invalidated, the invalidated public/private key pair $300_1$ is no longer in the ordering. The order of the public/private key pairs 200 in the key store is updated (at block 708) to reflect that the public/private key pair $200_2$ following the invalidated public/private key pair $200_1$ becomes the new first key pair in the ordering. The key store 106 may automatically update the ordering of the public/private key pairs $200_2 \ldots 200_n$ when the first public/private key pair $200_1$ is updated, such as to make public/private key pairs $200_2 \ldots 200_n$ key pairs $200_1 \ldots 200_{n-1}$.

With the operations of FIG. 7, the authentication server 100 may select a new private key to use from the generate group of public/private key pairs 200 without having to notify or propagate the public key of the new current private key 116 to all the computing systems 110. With the operations of FIG. 7, the private key being used may be updated in isolation from the operations of the computing systems 110, which is necessary for computing system 110 deployments that do not connect over a network or the Internet to the authentication server 100, such as for computing systems 110 that are maintained in very secure and controlled environments.

In certain embodiments, the authentication server 100 is not connected to the key store 106 to maintain the key store 106 isolated and protected. In such case, the administrator of the authentication server 100 may need to manually download the private key 204 of the determined next valid public/private key pair $200_i$ at block 702 of FIG. 7 to a removable non-volatile memory device, such as a thumb Flash drive, Secure Digital (SD) drive, etc. The administrator may then have to couple the removable non-volatile memory device to the authentication server 100 to allow the next private key 204 in the ordering to be uploaded and use as the current private key 116.

In embodiments where the authentication server 100 is not connected to the key store 106, the authentication server may send a message to an administrator or an email to the key store 106 to invalidate the public/private key pair $200_i$ in the key store 106 having the invalidated current private key. An administrator of the key store 106 may then retire the public/private key pair $200_i$ having the invalidated private key in the key store 106 which triggers the updating of the ordering of the remaining public/private key pairs 200 at block 708 of FIG. 7.

Figure 8:
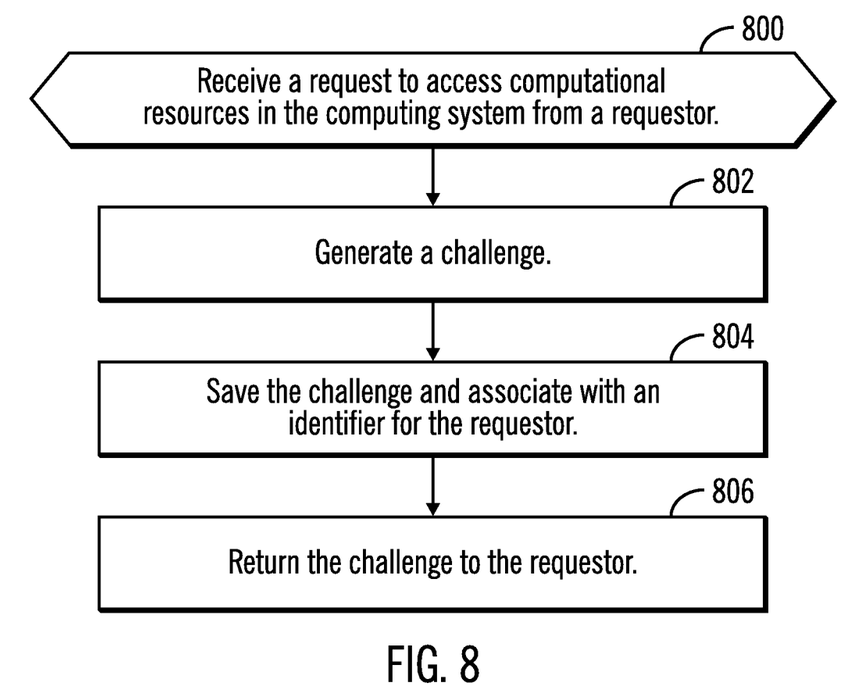
FIG. 8 illustrates an embodiment of operations to process a request to access computational resources at the computing system.

FIG. 8 illustrates an embodiment of operations performed by the access authentication module 118 at the computing system 110 to determine whether to grant access to the computing system 110 to a requestor, such as a service technician or other person, seeking access to the computational resources of the computing system 110. The requested computational resources may comprise access to firmware, software, application programs, etc. The requestor may attempt to access the computing system 110 through a user interface rendered at a display monitor of the computing system 110 or via a remote connection to the computing system 110 over a network. Upon receiving (at block 800) a request to access computational resources in the computing system 110, the access authentication module 118 generates (at block 802) a challenge $400_i$ for the requestor, such as a cryptographic challenge, e.g., a nonce. The challenge 402 is saved (at block 804) and associated with an identifier of the requestor 404. The challenge 402 is returned (at block 806) to the requestor 404, in the form of an electronic file or email or other transmission.

Figure 9:
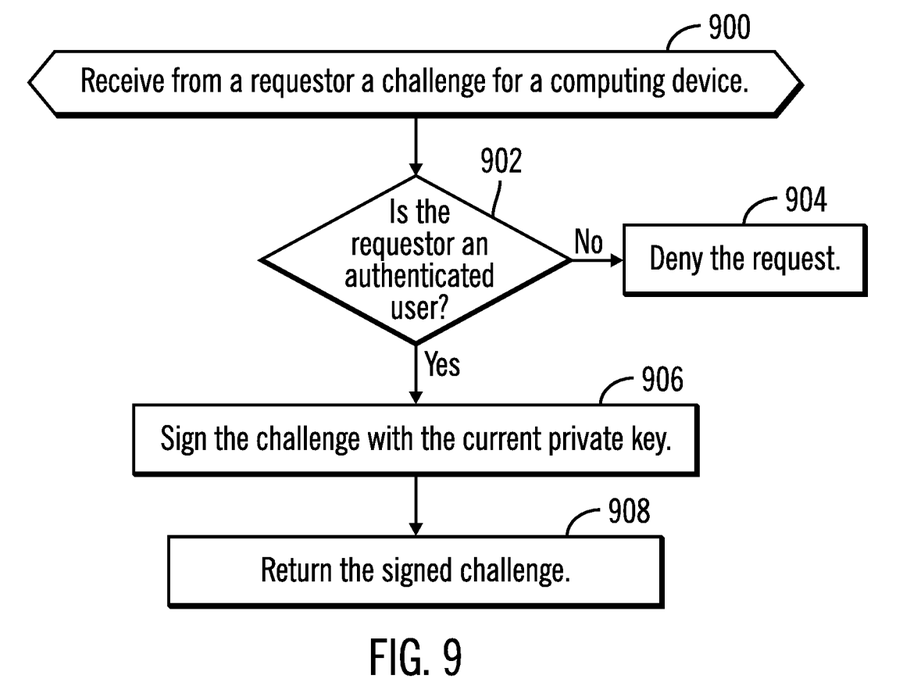
FIG. 9 illustrates an embodiment of operations to sign a challenge.

FIG. 9 illustrates an embodiment of operations performed by the authentication service 112 to process a challenge from a computing system 110 presented by a requestor, which may be provided via email, the requestor uploading the challenge, etc. Upon receiving (at block 900) a challenge from the requestor, the authentication service 112 may determine (at block 902) from the user authorization information 108 whether the requestor is an authenticated user. If not, the request from the requestor to cryptographically sign the challenge is denied (at block 904). If (at block 902) the requestor is an authorized user, then the challenge is cryptographically signed using with the current private key 116 with a cryptographic signing algorithm. The digitally signed challenge is returned (at block 908) to the requestor via email or downloading to a storage medium, or providing access through a file transfer mechanism, such as web site, etc.

Figure 10:
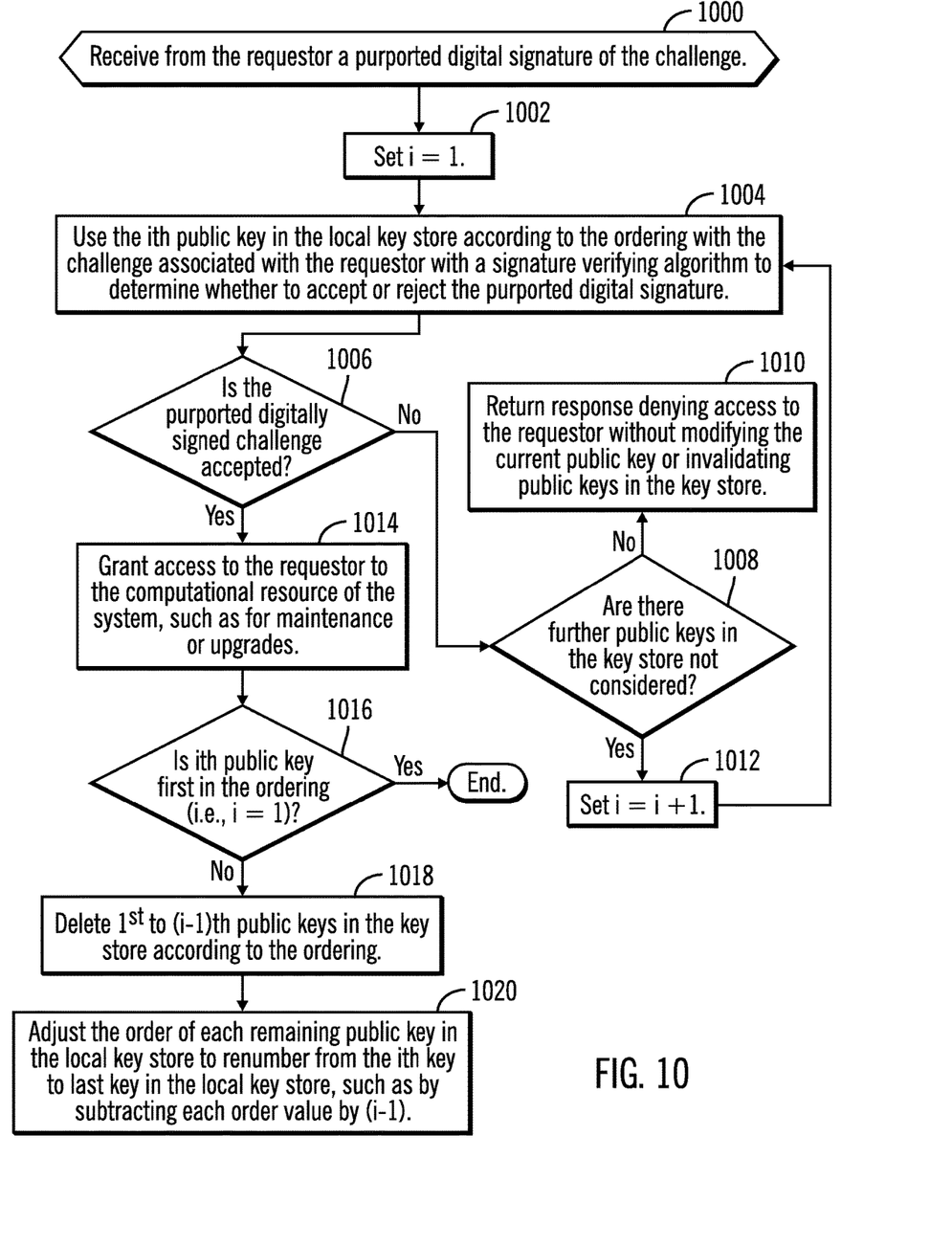
FIG. 10 illustrates an embodiment of operations to verify the signed challenge.

FIG. 10 illustrates an embodiment of operations performed by the access authentication module 118 to determine whether a purported digitally signed challenge presented by a requestor authenticates the requestor. The requestor may present the purported digitally signed challenge via email or uploading the purported digitally signed challenge at the computing system 110 terminal or over a network. A purported digitally signed challenge comprises a string that is presented as a digitally signed challenged that has not yet been confirmed as such. Upon receiving (at block 1000) the purported digitally signed challenge, the variable i is set (at block 1002) to one. The ith ordered public key $300_i$ in the local key store 120 according to the ordering and the challenge 402 associated with the requestor 404 are used (at block 1004) with a signature verifying algorithm, which may be part of the access authentication module 118, to determine whether to accept or reject the purported digitally signed challenge.

If (at block 1006) the signature verifying algorithm rejects (i.e., does not verify, does not accept) the purported digitally signed challenge for the requestor 404 and if (at block 1008) there are no further ordered public 300 keys in the key store not considered, i.e., following the ith public key in the ordering, then i is incremented (at block 1012) and control returns to block 1004 to try the next public key $300_{i+1}$, in the ordering. If (at block 1008) there are no further public keys to try in the ordering, then a response is returned (at block 1010) denying access to the requestor without modifying the current public key or invalidating any public keys in the local key store 120.

If (at block 1006) the purported digitally signed challenge is accepted by the signature verifying algorithm, i.e., verified, then the access authentication module 118 grants (at block 1014) access to the computational resource of the computing system 110, such as for maintenance or upgrades. If (at block 1016) the ith public key that verified the challenge is the first public key in the ordering, then control ends. Otherwise, if (at block 1016), the ith public key was not the first public key, i.e., multiple public keys were tried before finding one that was able to verify/accept, the digitally signed challenge, then the access authentication module 118 deletes (at block 1018) the first through (i−1)th public keys $300_1 \ldots 300_{i-1}$ in the local key store 120 according to the ordering, which comprise the public keys that failed to verify/accept the purported digitally signed challenge. The order of each remaining public key $300_{i-1} \ldots 300_n$ in the local key store 120 is adjusted (at block 1020) to be ordered $300_i \ldots 300_{n-1}$, such as by reordering the keys or pointers to the keys in a list or subtracting each key number 302 by (i−1).

With the operations of FIG. 10, the computing system 110 may independently select the correct public key $300_i$ to use to verify the digitally signed challenge when the authentication server 100 has switched to using a different private key, without any communication or coordination between the authentication server 100 and computing system 110. In FIG. 10 a signature verifying algorithm and digital signature are used to authenticate the requestor. In alternative embodiments, different cryptographic techniques using a public-private key pair and message may be used to authentication a requestor other than a digital signature and signature verifying algorithm.

The reference characters used herein, such as i and n, used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
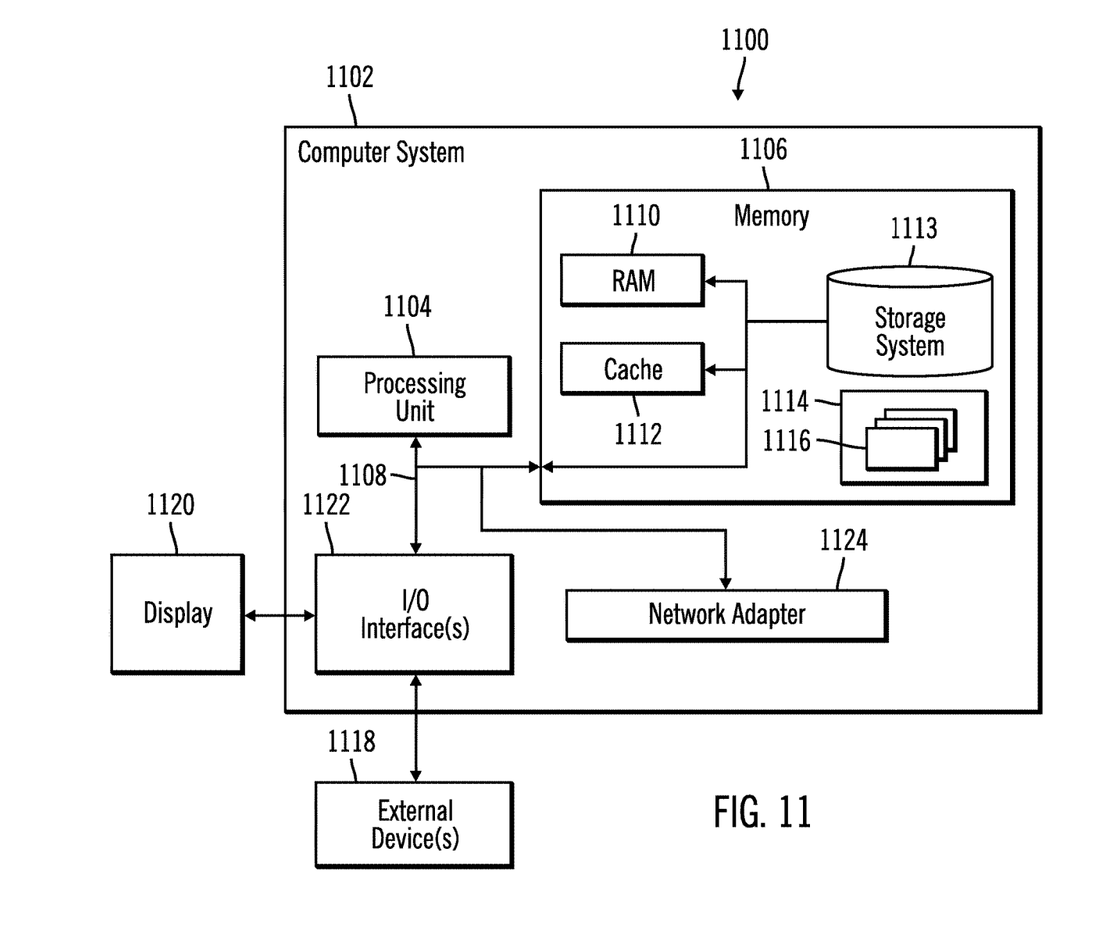
FIG. 11 illustrates a computing environment in which the components of FIG. 1 may be implemented.

The computational components of FIG. 1, including the authentication server 100 and the computing system 110, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product to manage public-private keys in an authentication system for computing systems over a network, wherein the computer program product comprises a computer readable storage medium having computer readable program instructions executed by a processor to perform operations, the operations comprising:
   generating a plurality of public-private key pairs to store in a key store;
   generating a set of public keys of the public-private key pairs;
   distributing the set of public keys to the computing systems to use to verify purported digitally signed challenges presented to the computing systems that are signed by the authentication system;
   selecting one of the public-private key pairs to use a private key of the selected one of the public-private key pairs as a current private key to use to digitally sign challenges from the computing systems;
   determining to retire the current private key;
   selecting another one of the public-private key pairs available in the key store; and
   setting the current private key to a private key of the selected another one of the public-private key pairs to use to digitally sign challenges from the computing systems, wherein the distributing the set of public keys to the computing systems to use to verify the purported digitally signed challenges results in the at least one computing system not connected to the authentication system to determine a public key of the selected another one of the public-private key pairs to use to verify purported digitally signed challenges from the authentication system.

2. The computer program product of claim 1, wherein the operations further comprise:
   sending a message to delete a public-private key pair from the key store including the current private key determined to retire in response to the determining to retire the current private key.

3. The computer program product of claim 1, wherein each of the generated plurality of public-private key pairs are associated with an order, wherein the selected one of the public-private key pairs comprises selecting a public-private key pair that is a first public-private key pair in the ordering, and wherein the selected one of another one of the public-private key pairs available in the key store comprises the public-private key pair next in the order following the public-private key pair having the current private key determined to retire.

4. The computer program product of claim 3, wherein the set of public keys have the order of the public keys in the public-private key pairs to cause the computing systems to process the distributed set of public keys in the order to verify a digitally signed challenge until a signed challenge is verified.

5. The computer program product of claim 1, wherein the key store is in a key system not electronically connected to the authentication system, wherein the operations further comprise:
   detecting a removable non-volatile memory device coupled to the authentication system; and
   reading the private key of the selected another one of the public-private key pairs available in the key store from the removable non-volatile memory device to store within the authentication system to use for the current private key.

6. The computer program product of claim 1, wherein the operations further comprise:
   receiving a challenge from a requestor generated by a computing system the requestor is attempting to access;
   determining whether the requestor is authorized to access the computing system from user authorization information; and
   digitally signing the challenge with the current private key to return to the requestor to present to the computing system to access the computing system.

7. A system comprising an authentication system to manage public-private keys for computing systems over a network, comprising:
   a processor coupled to a bus; and
   a computer readable storage medium, coupled to the bus, having computer readable program instructions executed by the processor to perform operations, the operations comprising:
     generating a plurality of public-private key pairs to store in a key store;
     generating a set of public keys of the public-private key pairs;
     distributing the set of public keys to the computing systems to use to verify purported digitally signed challenges presented to the computing systems that are signed by the authentication system;
     selecting one of the public-private key pairs to use a private key of the selected one of the public-private key pairs as a current private key to use to digitally sign challenges from the computing systems;
     determining to retire the current private key;
     selecting another one of the public-private key pairs available in the key store; and
     setting the current private key to a private key of the selected another one of the public-private key pairs to use to digitally sign challenges from the computing systems, wherein the distributing the set of public keys to the computing systems to use to verify the purported digitally signed challenges results in the at least one computing system not connected to the authentication system to determine a public key of the selected another one of the public-private key pairs to use to verify purported digitally signed challenges from the authentication system.

8. The system of claim 7, wherein the operations further comprise:
sending a message to delete a public-private key pair from the key store including the current private key determined to retire in response to the determining to retire the current private key.

9. The system of claim 7, wherein each of the generated plurality of public-private key pairs are associated with an order, wherein the selected one of the public-private key pairs comprises selecting a public-private key pair that is a first public-private key pair in the ordering, and wherein the selected one of the another one of the public-private key pairs available in the key store comprises the public-private key pair next in the order following the public-private key pair having the current private key determined to retire.

10. The system of claim 9, wherein the set of public keys have the order of the public keys in the public-private key pairs to cause the computing systems to process the distributed set of public keys in the order to verify a digitally signed challenge until a signed challenge is verified.

11. The system of claim 7, wherein the key store is in a key system not electronically connected to the authentication system, wherein the operations further comprise:
detecting a removable non-volatile memory device coupled to the authentication system; and
reading the private key of the selected another one of the public-private key pairs available in the key store from the removable non-volatile memory device to store within the authentication system to use for the current private key.

12. The system of claim 7, wherein the operations further comprise:
receiving a challenge from a requestor generated by a computing system the requestor is attempting to access;
determining whether the requestor is authorized to access the computing system from user authorization information; and
digitally signing the challenge with the current private key to return to the requestor to present to the computing system to access the computing system.

13. A method for managing public-private keys in an authentication system for computing systems over a network, comprising:
generating a plurality of public-private key pairs to store in a key store;
generating a set of public keys of the public-private key pairs;
distributing the set of public keys to the computing systems to use to verify purported digitally signed challenges presented to the computing systems that are signed by the authentication system;
selecting one of the public-private key pairs to use a private key of the selected one of the public-private key pairs as a current private key to use to digitally sign challenges from the computing systems;
determining to retire the current private key;
selecting another one of the public-private key pairs available in the key store; and
setting the current private key to a private key of the selected another one of the public-private key pairs to use to digitally sign challenges from the computing systems, wherein the distributing the set of public keys to the computing systems to use to verify the purported digitally signed challenges results in the at least one computing system not connected to the authentication system to determine a public key of the selected another one of the public-private key pairs to use to verify purported digitally signed challenges from the authentication system.

14. The method of claim 13, further comprising:
sending a message to delete a public-private key pair from the key store including the current private key determined to retire in response to the determining to retire the current private key.

15. The method of claim 13, wherein each of the generated plurality of public-private key pairs are associated with an order, wherein the selected one of the public-private key pairs comprises selecting a public-private key pair that is a first public-private key pair in the ordering, and wherein the selected one of the another one of the public-private key pairs available in the key store comprises the public-private key pair next in the order following the public-private key pair having the current private key determined to retire.

16. The method of claim 15, wherein the set of public keys have the order of the public keys in the public-private key pairs to cause the computing systems to process the distributed set of public keys in the order to verify a digitally signed challenge until a signed challenge is verified.

17. The method of claim 13, wherein the key store is in a key system not electronically connected to the authentication system, further comprising:
detecting a removable non-volatile memory device coupled to the authentication system; and
reading the private key of the selected another one of the public-private key pairs available in the key store from the removable non-volatile memory device to store within the authentication system to use for the current private key.

18. The method of claim 13, further comprising:
receiving a challenge from a requestor generated by a computing system the requestor is attempting to access;
determining whether the requestor is authorized to access the computing system from user authorization information; and
digitally signing the challenge with the current private key to return to the requestor to present to the computing system to access the computing system.

* * * * *